United States Patent

Gallagher et al.

[11] 4,005,442
[45] Jan. 25, 1977

[54] AUTOMATIC FOCUSING MECHANISM

[75] Inventors: John A. Gallagher, Barrington; Milan A. Broderick, Riverwoods, both of Ill.

[73] Assignee: Bell & Howell Company, Chicago, Ill.

[22] Filed: Dec. 26, 1974

[21] Appl. No.: 536,667

[52] U.S. Cl. .................................. 354/25; 354/165
[51] Int. Cl.² ...................... G03B 3/02; G03B 3/10
[58] Field of Search ............ 354/25, 165, 162, 163, 354/166; 356/4; 353/101; 352/140

[56] References Cited

UNITED STATES PATENTS

| | | | |
|---|---|---|---|
| 3,442,193 | 5/1969 | Pagel | 354/25 |
| 3,886,567 | 5/1975 | Matsumoto et al. | 354/25 |
| 3,896,304 | 7/1975 | Aoke et al. | 354/25 X |

Primary Examiner—L. T. Hix
Assistant Examiner—E. M. O'Connor
Attorney, Agent, or Firm—James B. Blanchard; Jerold A. Jacover

[57] ABSTRACT

An automatic focusing mechanism for adjusting the focus setting of the objective lens of an optical instrument such as a photographic camera. The adjustable focusing cell of the objective lens is coupled to a pivotal reception means so that the focus setting of the objective lens is maintained coincident with the distance between the camera and an object to be photographed when the longitudinal axis of the reception means is in alignment with a reflected light beam image transmitted from the camera to the object from an emission means spaced from the reception means. A rangefinder circuit controls the pivotal motion of the reception means so as to maintain its longitudinal axis in alignment with the reflected light beam image through variations in camera-to-object distance.

9 Claims, 5 Drawing Figures

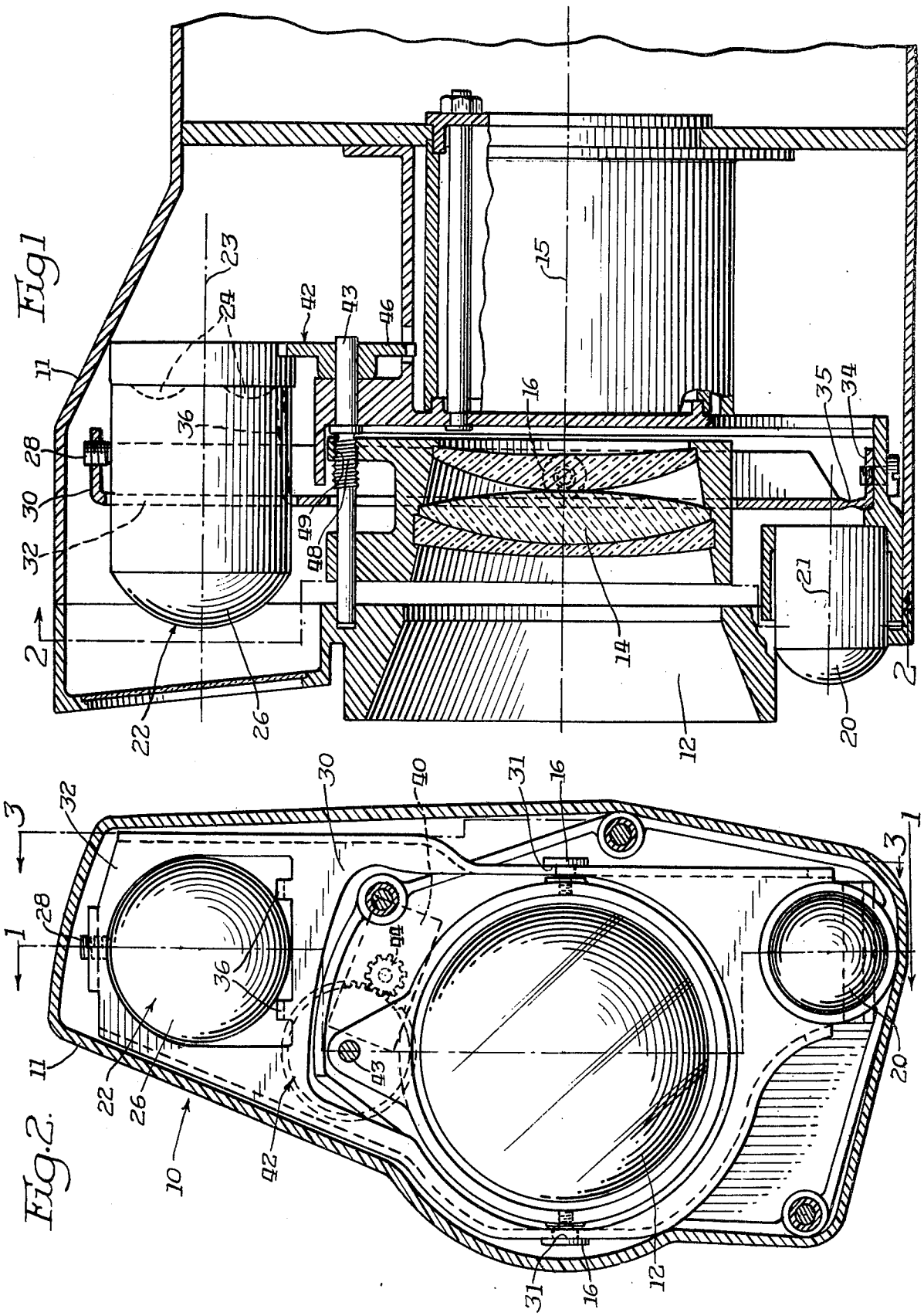

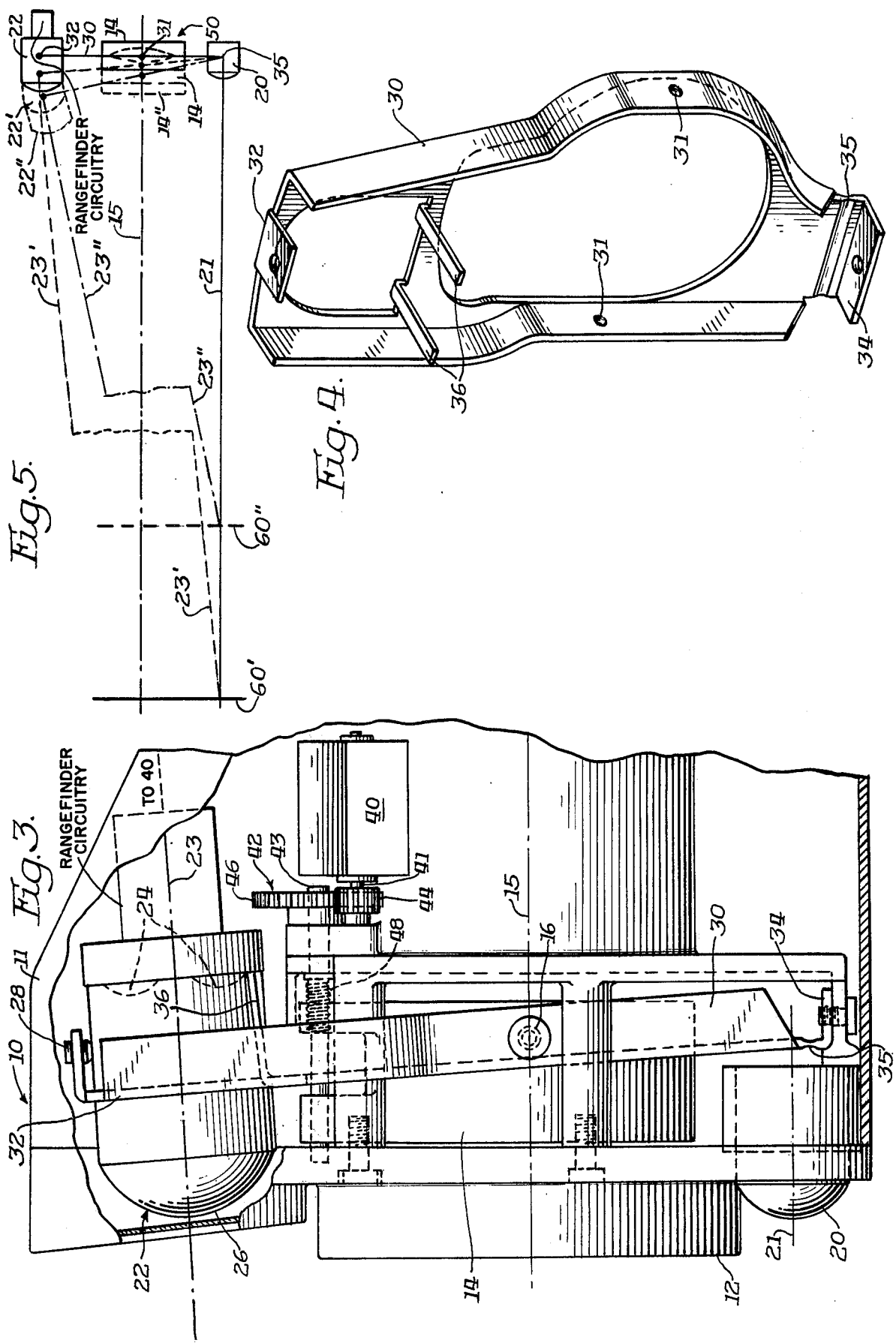

AUTOMATIC FOCUSING MECHANISM

INTRODUCTION

The present invention relates generally to a camera focusing mechanism and, more particularly, to a mechanism for automatically maintaining the focus setting of the objective lens of a camera coincident with the distance between the camera and an object to be photographed.

BACKGROUND OF THE INVENTION

Although various automatic focusing devices are known in the camera industry, it has been found that certain problems have been encountered in adapting such devices for commercial use. For example, due to the complexity of the mechanisms heretofore utilized to adjust the focus setting of the objective lens in response to variations in the camera-to-object distance, such systems have proven to be unsatisfactory because of their expense and general lack of reliability.

The present invention has been developed in order to overcome such problems by providing a relatively simple and inexpensive coupling mechanism between the adjustable focusing cell of the camera objective lens and a camera-to-object distance evaluating system. The coupling mechanism of the present invention offers a high degree of focusing accuracy and reliability under the most demanding operating conditions.

BRIEF DESCRIPTION OF THE INVENTION

In accordance with the present invention, the focusing cell of the camera objective lens is coupled to a pivotal reception means in such a manner that the focus setting of the objective lens is maintained coincident with the distance between the camera and an object to be photographed when the longitudinal axis of the reception means is in alignment with a light beam image reflected from the object. The light beam is projected from the camera to the object from a fixed emission means spaced from the reception means.

An electronic rangefinder circuit controls the pivotal motion of the reception means so as to maintain its longitudinal axis in alignment with the reflected light beam image through variations in the camera-to-object distance, thereby maintaining the proper focus setting of the camera objective lens which is coupled to said reception means.

The features of the present invention that are believed to be novel are set forth with particularity in the appended claims. The invention together with further advantages thereof may be best understood, however, with reference to the following description of the preferred embodiment taken in conjunction with the accompanying drawings.

BRIEF DESCRIPTION OF THE DRAWINGS

FIG. 1 is a partial side elevational view in section of an automatic focusing mechanism constructed in accordance with an embodiment of the present invention and taken along line 1—1 of FIG. 2;

FIG. 2 is a front view in section taken along line 2—2 of FIG. 1;

FIG. 3 is a partial side elevational view in section, similar to FIG. 1, taken along line 3—3 of FIG. 2 and showing the focusing mechanism of the present invention in a different operational position than in FIGS. 1 and 2;

FIG. 4 is a perspective view illustrating a portion of the structure shown in FIGS. 1–3;

FIG. 5 is a simplified diagrammatic representation of the operation of an embodiment of the present invention.

DESCRIPTION OF THE PREFERRED EMBODIMENT

Referring initially to FIGS. 1–3, the automatic focusing mechanism of the present invention is intended to be utilized with an optical instrument such as a photographic apparatus and typically indicated generally at 10, having an objective lens 12 with an axially displacable focusing cell 14 which may be adjusted so as to maintain the objective lens focus setting coincident with the distance between the camera and an object to be photographed. Objective lens 12 is mounted in lightproof enclosure 11 which also houses light sensitive media or film (not shown) upon which an image is to be produced.

The automatic focusing mechanism of the present invention is contained within the lightproof enclosure 11 of the camera and is intended to cooperate with automatic rangefinder circuitry such as that described in greater detail in a copending application entitled "Photoreceptor Assembly for Automatic Focusing System", Ser. No. 538,228, filed on Jan. 2, 1975.

In general, the rangefinder circuitry and automatic focusing mechanism operate in the following manner. The camera operator views the object to be photographed through a view finder (not shown) which causes a beam of light transmitted by an emission means 20 to impinge upon the object. The image of the light beam is reflected back from the object to a reception means 22 which is spaced from emission means 20 and is mounted on camera 10 for pivotal rotation. Reception means 22 is equipped to acquire the reflected light beam image throughout its entire range of pivotal adjustment and, in the preferred embodiment, has a pair of photoreceptors 24 mounted within it behind wide-angle lens 26 which detect, by means of the automatic rangefinder circuitry, when the longitudinal axis 23 of the reception means is in alignment with the reflected light beam image.

A means, such as plate 30 illustrated in FIG. 4, is provided for pivoting reception means 22 so as to track the reflected light beam image through the angular displacement caused by variations in the distance between the camera and the object to be photographed. Focusing cell 14 is mechanically coupled to plate 30 in such a manner that the focus setting of objective lens 12 is coincident with the distance between the camera and object when the longitudinal axis 23 of reception means 22 is in alignment with the reflected light beam image. This critical feature of the present invention is described in greater detail below.

The automatic rangefinder circuitry (not shown) also includes a means for controlling the pivotal operation of plate 30 in response to the output of photoreceptors 24 so as to automatically bring reception means 22 into axial alignment with the reflected light beam image which, in turn, maintains the focus setting of objective lens 12 due to the corresponding axial displacement of coupled focusing cell 14. In the preferred embodiment, a small DC motor 40 controls the pivotal operation of plate 30 by driving a transmission 42 secured to focusing cell 14. Whenever motor 40 is driven by the automatic rangefinder circuitry in response to the output of photoreceptors 26, its operation causes axial displacement of focusing cell 14 with respect to objective lens 12 and a corresponding pivotal displacement of reception means 22.

The operation of the automatic focusing mechanism of the preferred embodiment is best illustrated by the simplified diagrammatic representation of FIG. 5. In general, the system utilizes an active infrared triangulation rangefinder circuit 50 to evaluate the camera-to-object distance. A pivotally mounted plate 30 is mechanically coupled at points 31 to the focusing cell 14 of the camera objective lens. Emission means 20 is rigidly fixed to the camera and is provided with a light emitting diode (not shown) for projecting a beam of infrared light to the object to be photographed 60. The transmitted infrared light beam is modulated synchronously with electronic gates of the reception means circuitry so that only transmitted radiation is received and evaluated.

Reception means 22 is mounted at end 32 of plate 30 which allows it to pivot substantially about emission means 20, behind which the other plate end 34 is pivotally secured. In this manner, the reception means 22 is able to track the image reflected from object 60 through angular displacements caused by variations in the camera-to-subject distance, and is able to evaluate such distance variations through the well-known principles of rangefinder optical triangulation.

In the preferred embodiment, a motor adjusts focusing cell 14 through several tenths of an inch along its longitudinal axis 15 in order to obtain an infinite range of focus adjustments of the objective lens between a maximum distance approaching infinity (represented by focusing cell position 14 and the position of plate 30 illustrated in FIG. 1), down through intermediate distances (one of which is represented by focusing cell position 14' and object position 60'), to a minimum distance of about 4 feet (represented by focusing cell position 14" and object position 60" and the pivoted position of plate 30 illustrated in FIG. 3).

In order to obtain the desired triangulation relationship between focusing cell 14, the fixed emission means 20, and the pivotal reception means 22, focusing cell 14 is coupled to plate 30 between ends 32 and 34, and has its longitudinal axis 15 parallel to the longitudinal axis 21 of emission means 20. Due to the geometry of the above-described triangulation system, it is possible to position the coupling point 31 of focusing cell 14 along plate 30 in a manner that whenever the longitudinal axis 26 of reception means 22 is pivoted into alignment with the reflected light beam image, focusing cell 14 will be axially displaced a predetermined distance which will maintain the focus setting of the camera objective lens coincident with the distance between the camera and object to be photographed.

For example, if an object at distance 60' is to be photographed, the automatic rangefinder circuit will control the operation of the motor driven focusing cell so as to cause pivotal displacement of the reception means to position 22' so as to bring its longitudinal axis 23' into alignment with the reflected image of the light beam transmitted to the object by emission means 20 along its longitudinal axis 21. When the reception means is in such axial alignment with the reflected light beam, the focusing cell will be displaced along its longitudinal axis to position 14' by plate 30 which has been designed to correspond to the focus setting of the objective lens for that particular camera-to-object distance.

If the object is brought closer to the camera at position 60", the automatic rangefinder circuit will cause further pivotal displacement of the reception means to position 22", where its longitudinal axis 23" is in alignment with the reflected light beam image from the object, thereby axially displacing the focusing cell to new position 14" which has again been designed to correspond to that particular camera-to-object focus setting of the camera objective lens.

It should be noted from the above description that the focusing mechanism of the present invention may be modified for use with any camera utilizing an automatic rangefinder system for determining camera-to-object distances.

Referring now to the specific mechanical construction of the embodiment of the present invention shown in FIGS. 1–4, plate 30 is secured at end 34 to the internal frame of the camera 10 at a position located behind emission means 20 which is mounted in a fixed position on the camera. Plate 30 pivots substantially about emission means device 20 at a weakened portion 35 thereof.

Focusing cell 14 is mounted in the camera for movement along longitudinal axis 15 of objective lens 12. Plate 30 mechanically engages the focusing cell intermediate its ends at points 31, and is secured thereto by set screws 16. The mechanical engagement between focusing cell 14 and plate 30 is designed so that pivotal displacement of the plate will cause a corresponding axial displacement of the focusing cell with respect to the camera objective lens 12.

Reception means 22 is mounted at the other plate end 32 in such a manner that its longitudinal axis 23 is substantially perpendicular to the surface of plate 30. The pair of photoreceptors 24 within the reception means are arranged so that they are located on either side of longitudinal axis 23. The reception means is slightly adjustable with respect to plate 30 so as to allow for fine adjustment of the automatic focus setting system. This is accomplished by means of set screw 28 which, when loosened, allows the reception means to be slightly rotated on plate legs 36.

Focusing cell 14 is axially driven through its range of adjustment by motor 40 which operates through transmission 42. A gear 44 attached to the shaft 41 of the motor drives a corresponding gear 46 which is attached to transmission shaft 43. Transmission shaft 43 has a worm gear portion 48 which engages and drives a meshing section 49 formed in the housing of focusing lens 14.

An electrical rangefinder circuit (not shown) is also provided for controlling the operation of motor 40 in response to the output of the photoreceptors 24 whereby reception means 22 is automatically rotated into axial alignment with the light image reflect from the object to be photographed as a result of the axial displacement of focusing cell 14 by motor 40 and the mechanical coupling of said focusing cell to pivotal plate 30.

While a particular embodiment of the present invention has been shown and described, it should be understood that various changes and modifications thereto may be made, and it is therefore intended in the following claims to include all such modifications and changes as may fall within the true spirit and scope of this invention.

What is claimed is:

1. An automatic focusing mechanism for an optical instrument with an objective lens having an adjustable focusing cell for maintaining the focus setting of said objective lens in correspondence with the distance between said optical instrument and an object, said mechanism comprising:

means for emitting a beam of light from the optical instrument to the object;

means defining a longitudinal axis, spaced from said emission means, for receiving the image of said light beam reflected from said object; said reception means having detection means for producing an output corresponding to the alignment of said longitudinal axis of said reception means with said reflected light beam;

means for pivoting said reception means so that said reception means may track said reflected light beam through the angular displacement caused by variations in the distance between said optical instrument and said object; said pivoting means including plate means having a distal end pivotally secured to said optical instrument, a proximal end in mounting relationship with said reception means, and means coupling said focusing cell to said plate means intermediate said ends;

a rangefinder circuit, responsive to the output of said detection means, for producing a signal to operate a motor; and a motor, having means engaging said pivoting means for pivotal movement of said reception means, responsive to said signal to move said reception means so that the longitudinal axis thereof is in alignment with said reflected light beam, thereby maintaining the focus setting of said objective lens in correspondence with the distance between said optical instrument and the object.

2. The automatic focusing mechanism of claim 1 wherein said motor drives a transmission coupled to said adjustable focusing cell.

3. The automatic focusing mechanism of claim 2 wherein said emission means is rigidly fixed to said optical instrument.

4. The automatic focusing mechanism of claim 3 wherein said plate means pivots about a weakened portion thereof located substantially adjacent to said fixed emission means.

5. The automatic focusing mechanism of claim 4 wherein said focusing cell mechanically engages said plate means so that adjustment of said focusing cell by said motor will cause said plate means and attached reception means to pivot substantially about said fixed emission means.

6. The automatic focusing mechanism of claim 5 wherein operation of said motor displaces said focusing cell along the longitudinal axis of said objective lens and pivotally displaces said reception means a corresponding predetermined distance.

7. The automatic focusing mechanism of claim 6 wherein said optical instrument is a photographic camera.

8. An automatic focusing mechanism for an optical instrument with an objective lens having an adjustable focusing cell for maintaining the focus setting of said objective lens coincident with the distance between said optical instrument and an object, said mechanism comprising:

means for emitting a beam of light from the optical instrument to the object;

means for receiving the image of said light beam reflected from said object;

said reception means having a means for detecting when the longitudinal axis of said reception means is in alignment with said reflected light beam image;

a plate having an end pivotally secured to said optical instrument at a position located behind said emission means;

said reception means being mounted at the other end of said plate and said focusing cell having a means for mechanically engaging said plate intermediate said ends whereby the focus setting of the objective lens is coincident with the distance between said optical instrument and object when the longitudinal axis of said reception means is in alignment with said reflected light beam image;

a motor having a means for engaging said adjustable focusing cell whereby operation of said motor displaces said focusing cell along the longitudinal axis of said objective lens and pivotally displaces said reception means a corresponding predetermined distance substantially about said emission means;

a rangefinder circuit having a means for controlling the operation of said motor in response to the output of said detection means so that said reception means is maintained in axial alignment with said reflected light beam image, thereby maintaining the focus setting of said objective lens coincident with the distance between said optical instrument and object.

9. The automatic focusing mechanism of claim 8 wherein said reception means is mounted to said plate for movement at a predetermined ratio relative to the movement of said focusing cell as said plate is pivoted.

* * * * *